United States Patent [19]
Gubala et al.

[11] 3,790,706
[45] Feb. 5, 1974

[54] AUTOMATIC VIDEO CONTRAST CONTROL CIRCUIT

[75] Inventors: Thomas J. Gubala, Renton; Wayne O. Kraft, Seattle, both of Wash.

[73] Assignee: The Boeing Company, Seattle, Wash.

[22] Filed: May 25, 1972

[21] Appl. No.: 256,881

[52] U.S. Cl. ............................... 178/7.1, 178/7.3 R
[51] Int. Cl. ............................................ H04n 5/16
[58] Field of Search. 178/7.1, 7.3 R, 7.5 R, DIG. 33

[56] References Cited
UNITED STATES PATENTS

| | | | |
|---|---|---|---|
| 3,204,027 | 8/1965 | Clements | 178/7.3 R |
| 3,341,653 | 9/1967 | Kruse, Jr. | 178/DIG. 33 |

*Primary Examiner*—Richard Murray
*Attorney, Agent, or Firm*—Conrad O. Gardner

[57] ABSTRACT

An automatic video contrast control circuit in video signal processing for continuously detecting peak white and peak black levels and providing control signals therefrom to process the incoming video so that contrast is maximized by redefining the video black level and white level of the outgoing video. The method of signal processing comprises detection of the peak white and peak black amplitudes of the incoming video signals and then utilizing the voltage differential between the peak amplitudes to establish a plurality of bias levels for individual voltage level channel comparators which quantize the incoming video into a plurality of successive level signals which when combined and coupled to a display system provide the aforementioned contrast enhancement of the image.

9 Claims, 13 Drawing Figures

NORMAL HIGH CONTRAST VIDEO

LOW CONTRAST VIDEO

AUTOMATIC VIDEO CONTRAST CONTROL CIRCUIT

This invention relates to video contrast control circuits and more particularly to systems and circuits for improving the contrast of video signals having low contrast picture contrast.

Improvements in systems which develop a video signal have been proposed for increasing the contrast between areas of different apparent brightness on the viewed object. One approach to improvement of contrast between areas of different apparent brightness which has been proposed is by amplification of the video signal however for technical reasons it is usually not practical to amplify the entire amplitude range of the video signal and it therefore becomes necessary to provide some means for selecting for processing a particular amplitude range of the time varying video signal as for example is done in U. S. Pat. No. 3,205,446 to ALTEMUS. ALTEMUS is a manual control system which requires touch up by an operator for the system to extract maximum contrast. Another approach to contrast expansion is shown in U. S. Pat. No. 2,865,991 to Risner which however fails to define the black level in the picture and therefore does not create a new black level in the processed video but utilizes the existent black level and amplifies white level signals in a single ended type approach.

It is accordingly an object of the present invention to provide video contrast enhancement by peak black and white level amplitude detection of each field of video information signal and utilization of the voltage differential between peaks to control subsequent video signal processing of video signal information in each successive field of the reconstructed video.

It is a further object of the present invention to provide means for detecting peak black and white components in each field of a standard video type signal and utilizing these signals to bias a plurality of digital comparators for converting analog television picture information wherein the digital pulses are subsequently summed in a video amplifier to provide the output video picture information signal.

These and other objects of the invention are accomplished by coupling the composite input video signal in common to the positive terminals of a plurality of digital comparator circuits for converting the analog type television picture information signals into digital form, and also coupling the composite input video signals to a pair of channels for detecting peak white and peak black video levels respectively. The outputs of the pair of channels are differentially applied across a series resistor type potential divider for division into an equal number of steps. The potential steps obtained from the divider are applied to the respective comparators as comparison levels therefor. The video contrast circuit is arranged to provide real time automatic video contrast expansion of a video signal of varying amplitude utilizing peak white and peak black level control signals to reestablish a new white and black level in the processed video signal.

For a better understanding of the present invention together with other and further objects thereof reference should now be made to the following detailed description which is to be read in conjunction with the accompanying drawings in which.

Figure 5A:
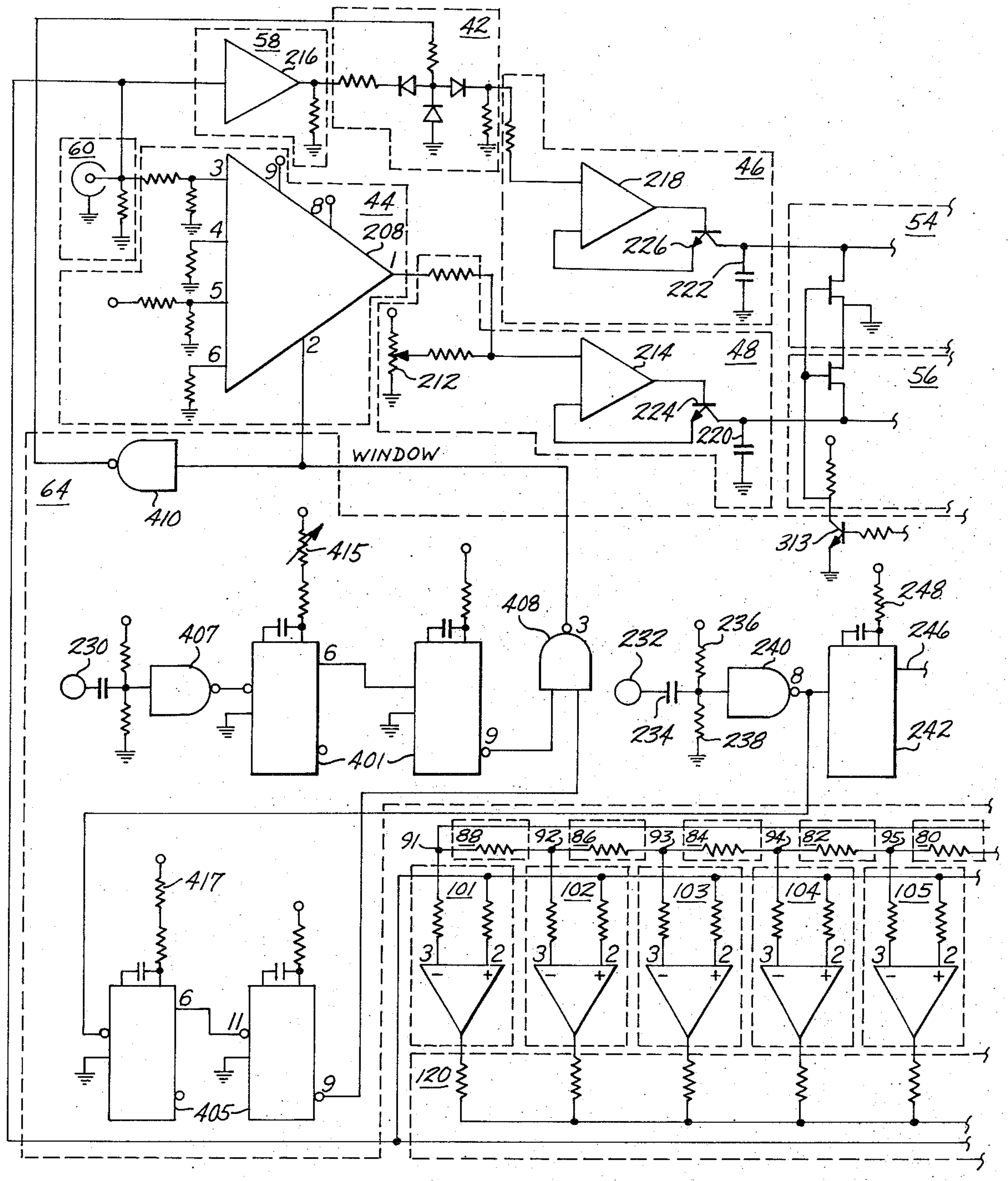
Figure 5B:
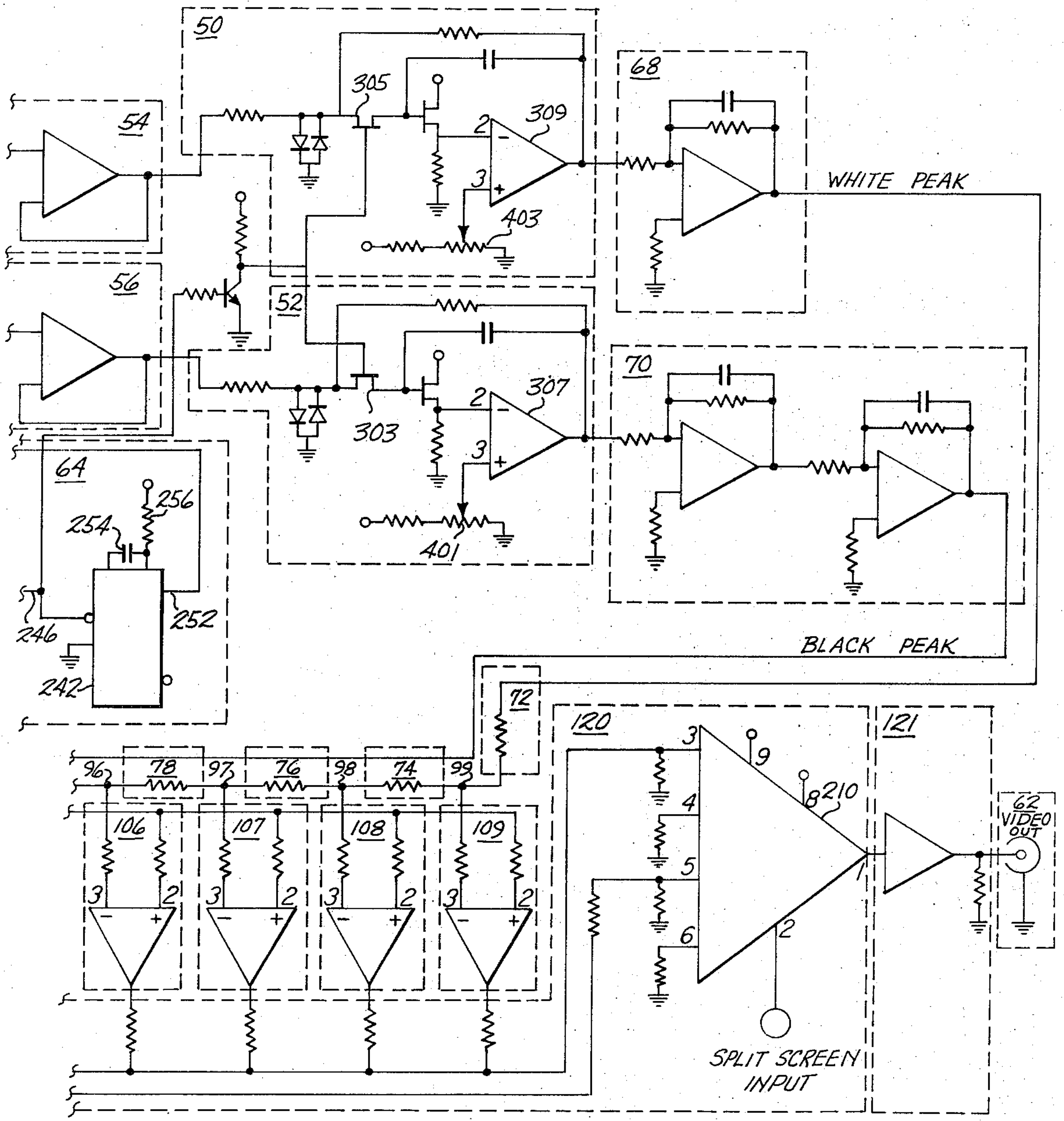
Figure 6:
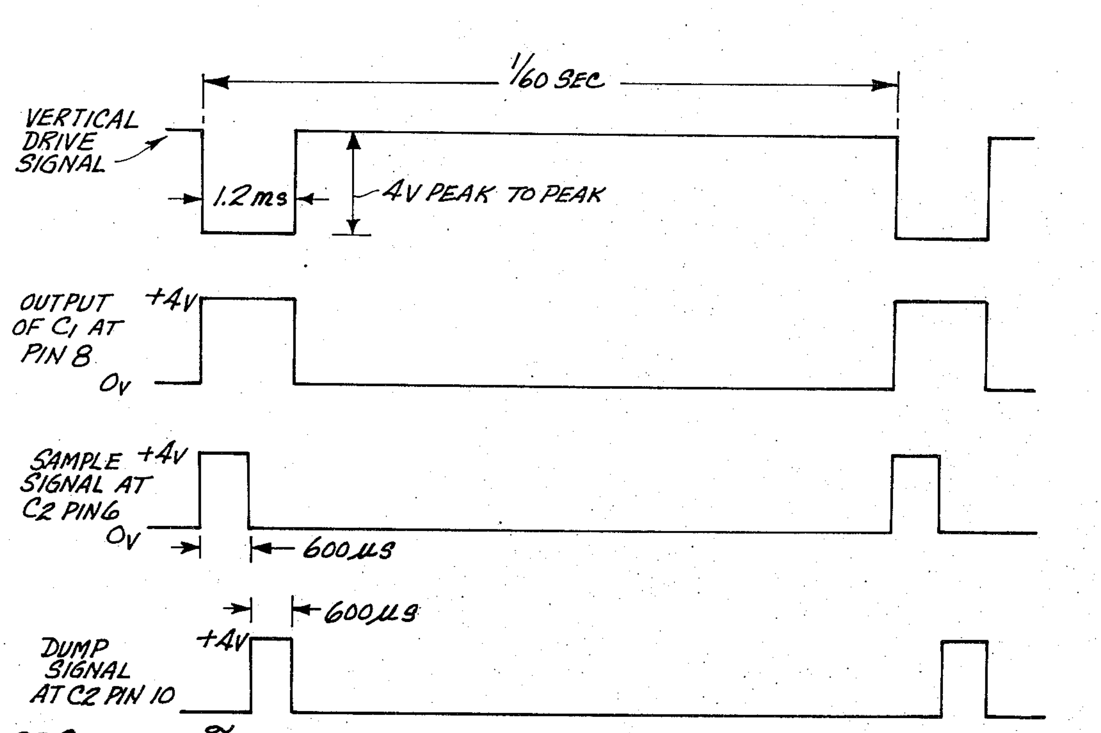
Figure 7:
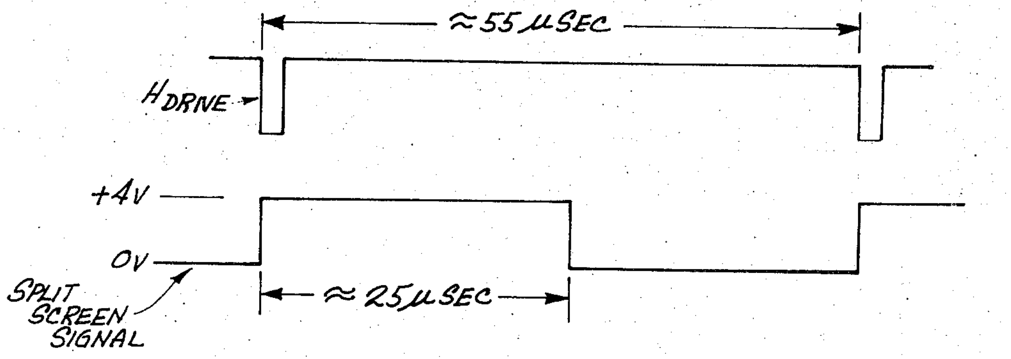
Figure 8:
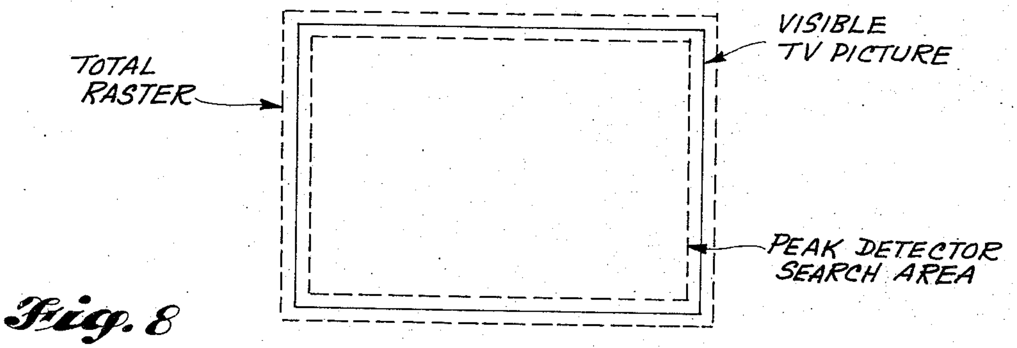
Figure 9:
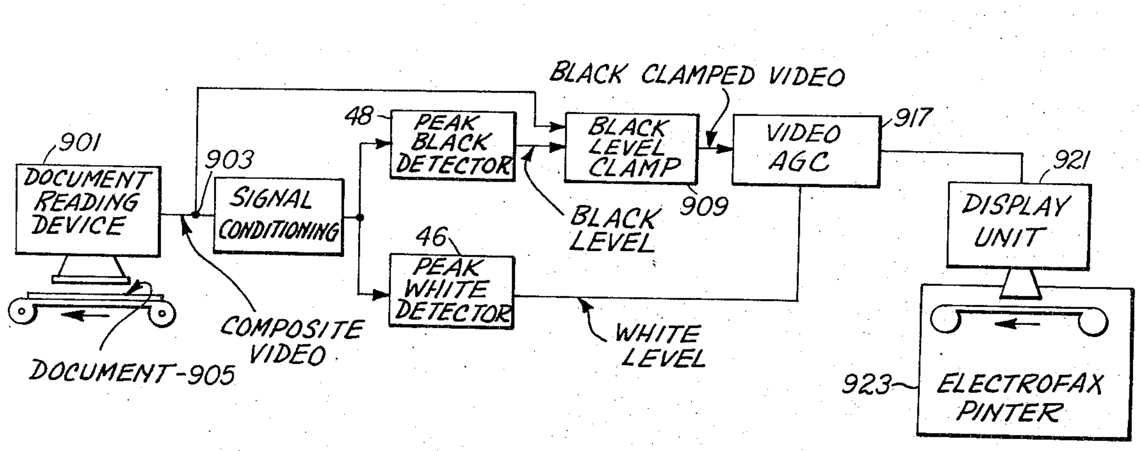
Figure 10:
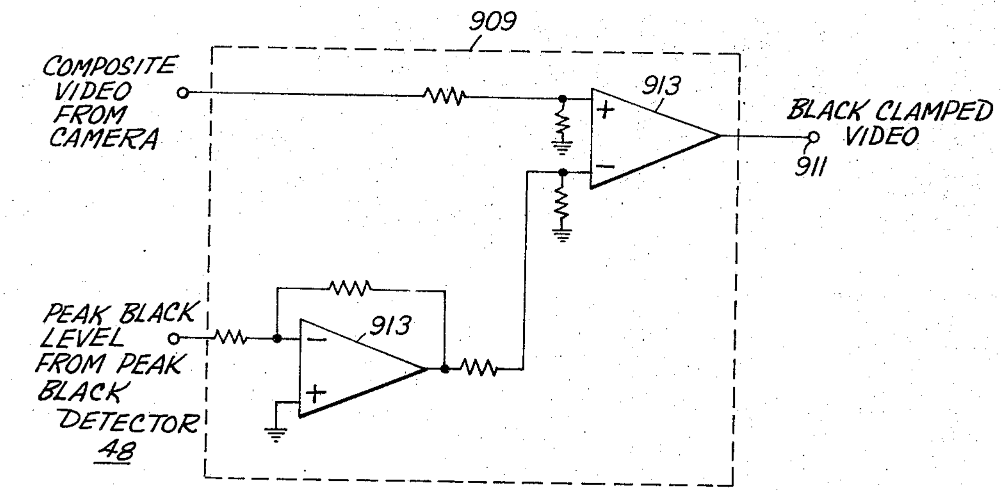
Figure 11:
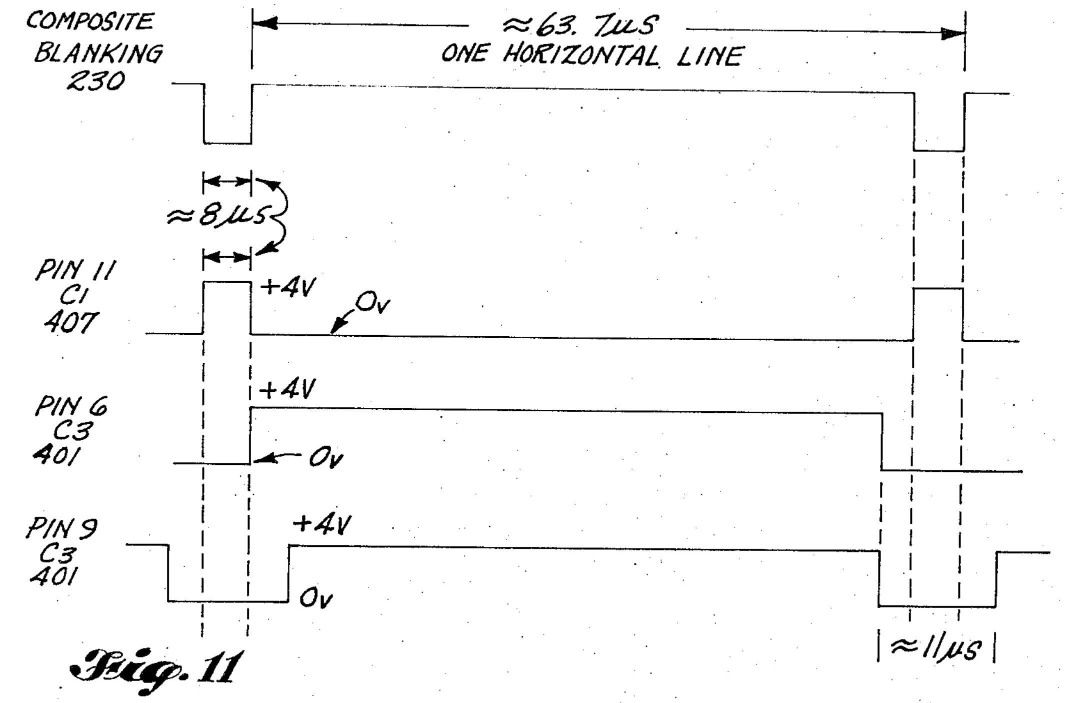
Figure 12:
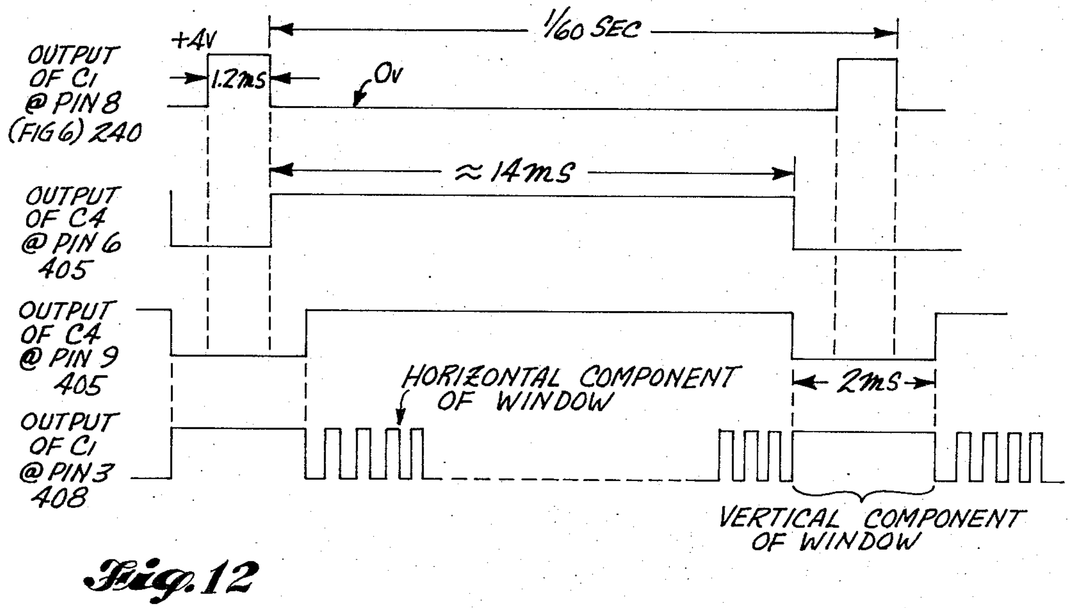

FIGS. 5A and 5B when placed side by side and connected together provide a complete circuit diagram of a video processing circuit for providing contrast enhancement according to an embodiment of the present invention;

FIG. 6 is a timing diagram showing sample and dump signal relationship to vertical drive pulses in the circuit of FIGS. 5A – 5B;

FIG. 7 is a timing diagram showing a logic signal required in the circuit of FIGS. 5A – 5B required for split screen display of processed and improcessed video;

FIG. 8 is illustrative of the window searched by peak detector circuits in accordance with a feature of the circuit of FIGS. 5A – 5B;

FIG. 9 is illustrative of a system for contrast enhancement of copies of documents made on an Electrofax printer in accordance with a further embodiment of the present invention;

FIG. 10 is an analog circuit for providing black level clamping of video signals which may be utilized in the system shown in FIG. 6;

FIG. 11 is illustrative of a plurality of signal voltage waveshapes utilized in the circuit of FIGS. 5A – 5B in developing the horizontal component of window search control signals;

FIG. 12 is illustrative of a plurality of signal voltage waveshapes utilized in the circuit of FIG. 5A – 5B in developing the vertical component of window search control signals.

Figure 1:
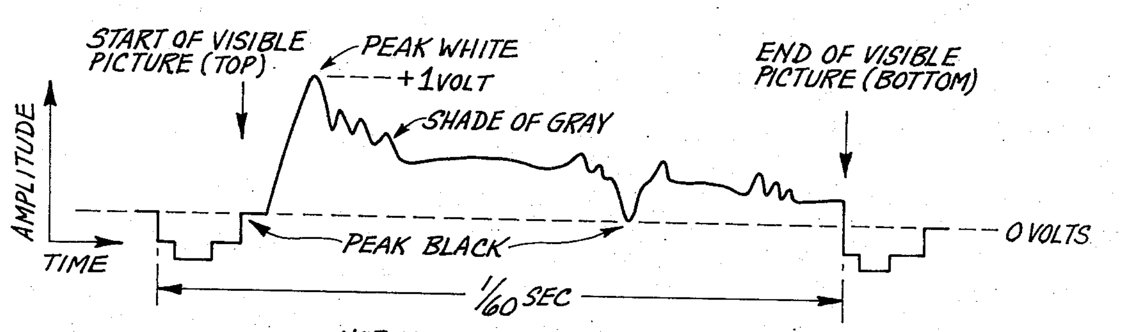
FIG. 1 is a graph of one field of a typical composite video signal having maximum contrast.
Figure 2:
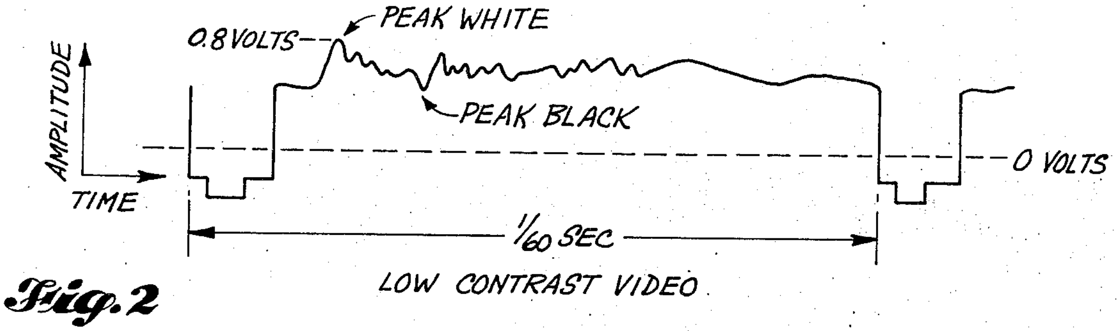
FIG. 2 is a graph of one field of a typical composite video signal having low contrast.

Turning now to a consideration of the typical composite video signals shown in FIGS. 1 and 2 and a comparison respectively of high and low contrast video picture information, an introductory appreciation of the present video enhancement problem and proposed solutions will aid in an understanding of the present invention. The composite video signal commonly utilized in video transmission systems, e.g., commercial closed-circuit television systems comprises synchronzation pulses and an intensity modulation component. FIG. 1 shows one field of a typical composite video signal (the horizontal blanking and horizontal sync pulses have been omitted for clarity). It should be noted that one field (one half of a complete frame) consists of all shades of gray from peak white to peak black. The waveshape shown in FIG. 1 is representative of a picture having maximum contrast. The waveshape of the video information signal shown in FIG. 2 is representative of a low contrast picture. Note here should be made that the peak black in the picture is actually a shade of gray which is very close to being white. If the small range of video signal amplitude present in the picture shown in FIG. 2 were expanded such that peak value of the black level becomes zero volts or the same peak value as the black portion shown in FIG. 1 and the peak value of the white level in FIG. 2 becomes the same peak value as the white portion shown in FIG. 1, then the resultant picture will have high contrast. However this cannot be accomplished by additional video gain alone; if the video signal of FIG. 2 is amplified, the white picture content becomes whiter but the black picture content also becomes whiter with consequent little gain in the range of the output video.

In order to accomplish a conversion of the low contrast picture information of FIG. 2 to a high contrast type picture information signal as portrayed in FIG. 1 it becomes necessary to examine the picture and redefine the black and white levels. If picture information in the video signal is continuously searched for peak white and peak black level signal components, the range of the picture video signal level variation is established and can be utilized to redefine the picture as represented by the video signal. An important feature of the present signal processing discussed hereinafter is that this redefinition or processing of the original video signal can be accomplished without significant loss of information content. Consider in contrast in this connection the signal processing in the ALTEMUS patent hereinbefore referred to where a particular amplitude range of the time varying video signal is selected and processed.

Figure 3:
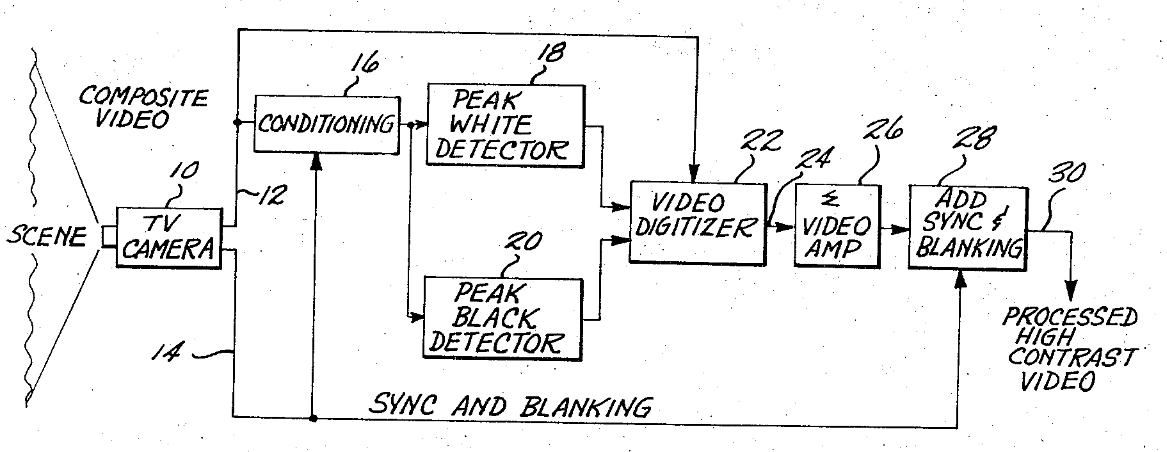
FIG. 3 is a simplified block diagram of a television camera system incorporating contrast enhancement of video information signals in accordance with an embodiment of the present invention.

Turning now to FIG. 3 there is shown a simplified block diagram of a system utilizing the present video processing for achieving contrast enhancement of images presented by documents or other scenes either still or in motion containing video information of low contrast. In FIG. 3 a video pick up device comprising TV camera 10 developes from an image video information signals inculding luminance information such as the low contrast video analog type signal of FIG. 2 available at the output of camera 10 on lead 12 and sync and blanking pulses on lead 14. Video information signals from TV camera 10 are coupled by lead 12 to video information signal conditioning means 16 comprising video driver and clamping circuits to peak white level detector circuit 18 and peak black level detector circuit 20 which level detector circuits search each field of video signal for peak amplitude levels of white and black information components. These detected amplitude levels are then utilized to bias a plurality of digital comparator circuits in video digitizer circuit means 22 which converts the analog video information signal into a digital type video information signal. The digital type video information signal present on lead 24 available at the output of video digitizer 22 is coupled to video amplifier circuit means 26 where the digital pulses are linearly summed to reassemble the picture in analog form. Video amplifier circuit means 26 is then coupled to sync and blanking pulse adder circuit 28 where sync and blanking pulses available from TV camera 10 on lead 14 are added to the processed high contrast video signal at lead 30 as shown. The processed high contrast video may be recorded by copier means or displayed and/or coupled through to an open or closed TV transmission system.

The video may be processed in the above manner for subsequent utilization ultimately by television type display means and tests have shown that where the scene initially observed is not provided with sufficient contrast e.g., terrain at a distance on a cloudy day without adequate lighting, the contrast enhanced image makes the information content much more meaningful and pleasing to the eye of the observer focused on the television type display.

While the above exemplary processing technique utilizes digital type signal processing, a further example given hereinafter is illustrative of analog signal processing to achieve high contrast video signal processing.

Figure 4:
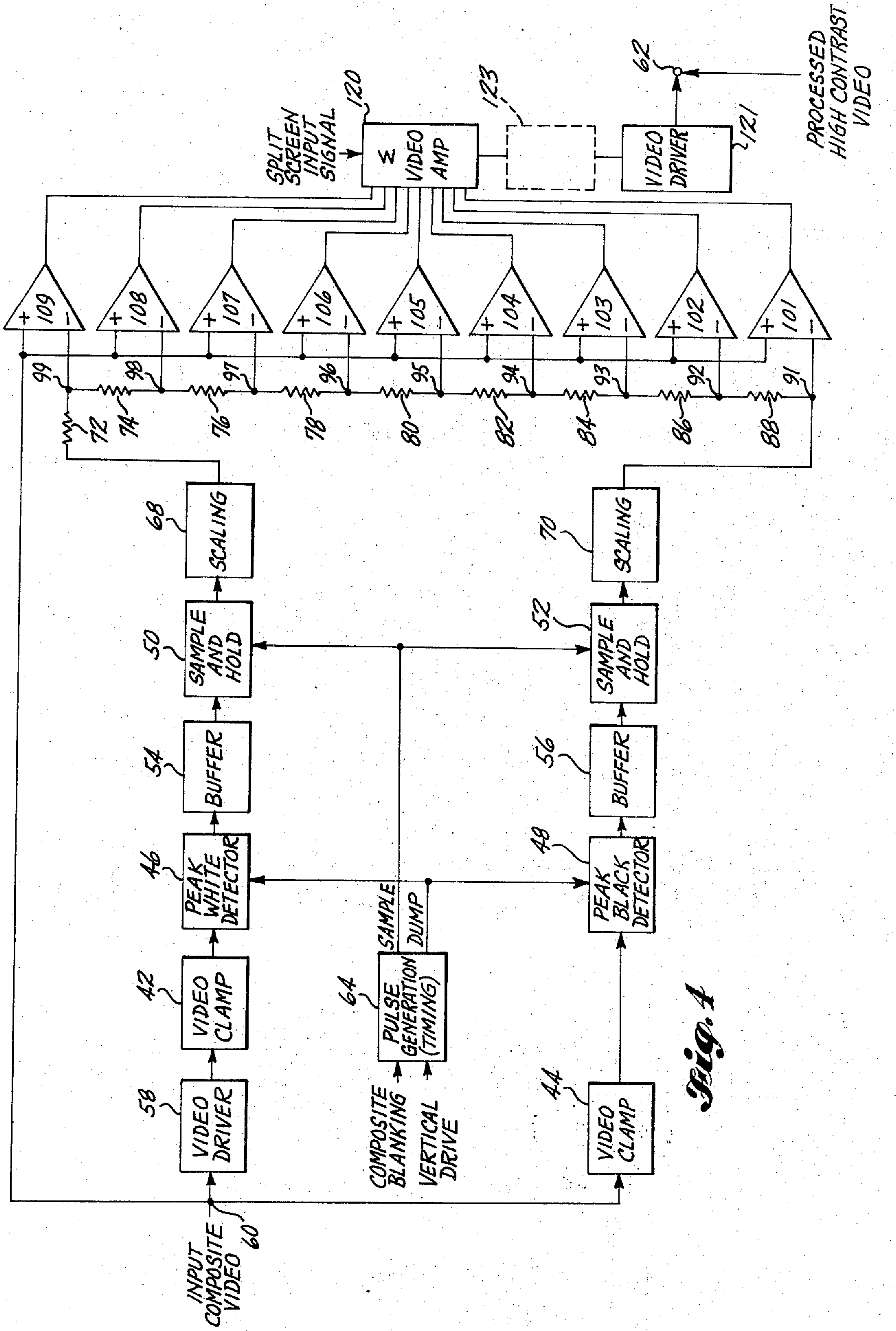
FIG. 4 is a block diagram of a video contrast enhancement circuit shown in complete schematic diagram in FIGS. 5A – 5B.

Turning now to FIG. 4 wherein a block diagram illustrative of the types of circuits useful in a system for video contrast enhancement are shown, it will be noted that while neither a specific means for generating the input composite video signal nor specific utilization means for utilizing the processed high contrast video are shown in FIG. 4, the present signal processing system may be utilized in various types of copying systems and television systems where peak levels of the scanned image do not have the desired contrast and it is therefore desired to redefine these peak levels in the display of the scanned image to be reproduced.

It can readily be appreciated by those skilled in the art that in many cases in the copier art the original document scanned is of poor quality or does not have the quality desired in terms of contrast and as a consequence the copies produced therefrom in many cases suffer the same, and in some cases where the copier machines are not functioning properly or adjusted properly, a greater contrast deficiency, e.g., where the copies are all very light near white without a sufficient black content. Where it is desired to improve the quality of these copies, the type of signal processing by detecting the peak levels of the scanned image and enhancement in the copy illustrated in FIG. 4 may be utilized in these machines. It should be recognized that the signal processing concept illustrated in FIG. 4 is exemplary of a system where the original document is scanned to provide composite video information signals and the system shown performs the peak black and peak white level signal detection in a particular manner ignoring the sync and blanking signals on the input composite video signals. In copying systems where a video information signal of different type is developed peak black and white level information signals will still be developed from the original document but provisions for the sync and blanking signals and their reinsertion as shown in the block schematic of FIG. 4 would not be required. In the case of automatic xerographic reproducing machines of known type which include a xerographic plate, the processed high contrast video output signal may be utilized by a scanning electron beam at the exposure station in such systems which electron beam is projected onto the plate surface to thereby form the electrostatic image thereon of the copy to be reproduced. Further adaptations and embodiments of the signal processing herein disclosed to these and other copying and television applications will become obvious to those skilled in the art upon a better understanding of the present invention as hereinafter described.

Continuing now to the description of the expanded block diagram of FIG. 4, it will be noted that the purpose of video clamp circuits 42 and 44 is to disable peak white level signal detector circuit 46 and peak black level signal detector circuit 48 respectively in the first and second channels during blanking time. Video clamp circuit 44 in the second channel (second peak amplitude detector channel) clamps the input video to a large amplitude white level signal during the blanking time period. Thus the peak black level signal detector circuit is not responsive to the sync and blanking signals on the input composite video signal. Sample and hold circuits 50 and 52 sample the outputs of peak detectors 46 and 48 every one sixtieth of a second subsequent to buffering of the outputs of peak detectors 46 and 48 in the first and second channels by buffer circuits 54 and 56 respectively. A video driver circuit 58 is shown in the first channel coupled to input terminal 60 for amplifying the composite video signal to insure adequate signal level application to video clamping circuit 42. The aforementioned one sixtieth of a second sampling afforded by sample and hold circuits 50 and 52 in the first and second peak amplitude detector channels occurs during the first half of the vertical blanking period. In the second half of the vertical blanking time interval, the signal levels available at the outputs of peak detector circuits 46 and 48 is utilized in the first and second channels respectively, and peak detector circuits 46 and 48 are dumped and readied for peak signal level detection of the input video in the first and second channels during the first half of the subsequent vertical blanking time interval. This sequential detection and sample and hold cycle during the first portion of the vertical blanking time interval and subsequent utilization and dumping during subsequent portion or second half of the vertical blanking time interval is controlled by pulse generator (timing) circuit 64. It can thus be seen that the signal processing system of FIG. 4 can be considered to be one field behind in that the composite video signal available at the output terminal 62 which is the result of the signal processing of picture information present in the composite video signal at the input terminal 60 one field previously in time. This delay by one field is not a deficiency in the aforementioned applications in copying systems and television systems. For all practical applications it can be seen that the system appears to operate in real time with the abovementioned delay unnoticed.

Subsequent to peak positive and negative going pulse detection of picture information signals in the first and second channels respectively representative of the white and black extent of the picture information signals and scaling of the sample and hold signals coupled respectively to first and second scaling circuits 68 and 70, the voltage difference between the peak and black levels of the video is divided in the exemplary circuit of FIG. 4 into 10 equal steps. Now, for purposes of illustration, the peak white level signal may at some instant of time equal 1 volt and the peak black signal may equal 0 volts when the input composite video signal is representative of a given image. The voltage divider formed by the nine resistors 72, 74, 76, 78, 80, 82, 84, 86, and 88, then provides a plurality, viz., 10 0.1 volt bias voltages. These bias voltages developed at terminals 91, 92, 93, 94, 95, 96, 97, 98, and 99 are coupled to the first input (−) terminals of comparator circuits 101, 102, 103, 104, 105, 106, 107, 108, and 109 respectively for biasing the individual comparator circuits whereas the second input terminals (+) of all of the comparator circuits are coupled to the incoming composite video signal present at input terminal 60 of the signal processing system of FIG. 4. In the example given for a 0 to 1 volt range video signal amplitude variation, when the analog video signal exceeds the 0.1 volts level at a given point in time, comparator circuit 101 produces an output signal, level, e.g., of 4 volts, which is coupled to summing amplifier circuit 120. If the analog video signal amplitude at this given point in time is actually 0.15 volts, then only comparator circuit 101 is responsive since this amplitude level is insufficient to cause the second comparator circuit 102 biased at the higher 0.2 volts level to be reached and turned ON. Now, at some other instant of time depending upon the information content, the analog video signal amplitude may be 0.35 volts at which time it will be realized that comparator circuits 101, 102, and 103 are turned ON since their respective bias level voltages of 0.1 volts, 0.2 volts and 0.3 volts respectively have all been exceeded by the video signal amplitude. As the field of television signal information continues, all of the comparator circuits 101 through 109 will be turned on providing a full ten shades of gray between the peak black and white levels detected.

A significant feature in video signal processing provided in the present system can now be recognized. As a further example where the input video is of low contrast, e.g., the analog video signal having a range of 0.5 volts to 0.8 volts, the present system will demand that ten shades of gray exist within this peak voltage variation of 0.3 volts. Thus the 0.5 volt original black level of the input analog signal has a 0 volts level at output terminal 62 while the white level of the input analog signal has a 1 volt level at output terminal 62 with eight shades of gray between the newly established black and white levels at output terminal 62. This redefinition of white and black levels to predetermined desired white and black levels (1 and 0 volts) with a predetermined number of shades of gray therebetween provides the expansion of picture contrast of an initial analog signal having insufficient or undesired black and white levels.

While the block diagram of FIG. 4 shows video amplifier circuit 120 and video driver circuit 121 series coupled between comparator circuits 101, 102, 103, 104, 105, 106, 107, 108, and 109 and output terminal 62 for summing the comparator circuit outputs and providing the analog video output signal, there is shown in phantom (by dotted line representation) a further sync and blanking pulse signal inserting circuit 123 which may also be coupled in series circuit in the aforementioned circuit path to output terminal 62. This signal inserting circuit 123 may be utilized in applications where besides the video signal, these timing pulses must be reinserted as where a composite television type signal is further required to be transmitted to a remote location and at which location the original sync and blanking pulse signals are not available for use in controlling the displayed video.

Turning now to FIG. 5A – 5B which is a full circuit schematic implementation of the system shown in block diagram form in FIG. 4, it will be noted that the input television type video signal applied to input terminal 60 is coupled to video clamping circuit means 44 which includes a video switching amplifier circuit 208 (type MC 1545). The composite video signal is also coupled to video driver circuit means 58 and in common to the positive terminals (pin 2) of a plurality of digital comparator circuits 101, 102, 103, 104, 105, 106, 107, 108, and 109. The composite video signal is further coupled from input terminal 60 to an input terminal of summing amplifier circuit means 120, viz., pin 5 of video switching amplifier circuit 210 (type MC 1545) which includes the function of providing split screen display of processed and unprocessed video, a feature hereinafter discussed in more detail.

In video clamping circuit means 44, the purpose of the video amplifier switching circuit 208 is to provide for disabling of peak black level detector circuit means 48 during a predetermined time period exceeding sync time periods (horizontal and vertical periods) and further provide for inversion of the video information signals. Video clamp circuit means 44 comprising switching amplifier circuit 208 switches on a large amplitude white level video signal during vertical and horizontal blanking time. Without this function provide by switching amplifier circuit 208, peak black level detector circuit 48 would always detect sync amplitude levels and not the black level content of the picture information. The inverted, switched video is coupled from switching amplifier circuit 208 to peak black level detector circuit 48 which searches for positive peaks in the video (now inverted negative peaks from which the sync level peaks have been removed by the aforementioned signal processing). A potentiometer 212 is coupled to an input terminal of amplifier circuit 214 of peak black level detector circuit 48 for adjusting the bias and consequent operating level of amplifier circuit 214.

As mentioned previously, the input video information signal is coupled to video driver circuit means 58, more specifically to amplifier circuit 216 (National NH0002C High Slow Rate Driver). Video driver circuit 216 is coupled through low input impedance video clamp circuit 42 to peak white detector circuit 46. Peak detector circuits 46 and 48 function in the following manner: When the output signal voltages of the operational amplifier circuits 214 and 218 in peak black and white detector circuits 48 and 46 respectively exceed the charge potentials stored on respective holding capacitors 220 and 222, NPN transistors 224 and 226 are forward biased and holding capacitors 220 and 222 charge to the new peak voltage levels established by the output signal voltages present at the outputs of operational amplifier circuits 214 and 218 respectively. Buffer amplifier circuits 56 and 54 coupled to black and white peak detector circuits 48 and 46 respectively provide very high impedance loads on respective holding capacitors 220 and 222 (typically 400 megohms).

Turning now to the following description, an explanation of how the sample and dump signals are generated by pulse generator circuit 64 will lead to a more complete understanding of system operation.

The composite blanking signals from the input video are coupled to input terminal 230 of pulse generation circuit 64 while the vertical drive signals are coupled to further input terminal 232. The vertical drive signals coupled to input terminal 232 have the waveshape shown in the timing diagram of FIG. 6. A coupling network comprising coupling capacitor 234 and resistors 236 and 238 couple the vertical drive pulse to gate 240 thereby causing gate 240 to switch ON (causing the input signal at the input terminal of gate 240 to be transmitted to the output terminal) regardless of the bias level of the vertical drive signal. The output of gate 240 is a logic level inversion of the vertical drive pulse and denoted output of C1 at pin 8 in the waveshape representation thereof shown in the timing diagram of FIG. 6. The rising edge of this signal is coupled to dual monostable circuit 242 for triggering a first half (left side in the figure) of dual monostable circuit 242, the pulse length of the output of this portion of dual monostable circuit 242 generated at output terminal 246 comprises the sample signal having the waveshape denoted sample signal at C2 pin 6 shown in FIG. 6. The pulse length of the sample signal shown is about 600 microseconds, however, the time duration of the sample pulse is determined by resistor 248 and capacitor 250 coupled to dual monostable circuit 242 in the manner specifically shown in the circuit diagram.

The trailing edge of the sample signal at output terminal 206 is coupled to the second half (another section as shown on the right side in the figure) of dual monostable circuit 242 thereby producing a further pulse of about 600 microsecond duration termed dump signal at further output terminal 252 and the relationship in time of this dump signal denoted dump signal at 62 pin 10 in the timing diagram of FIG. 6 in relation to the sample signal and vertical drive signal can be observed in this timing diagram. Capacitor 254 and resistor 256 coupled to the second half of dual monostable circuit 242 perform the same function of determining time duration of the dump pulse as capacitor 250 and resistor 248 in determining length of sample pulse in the present dual monostable circuit 242.

The sample and dump signals generated in the above manner by pulse generating circuit 64 thereby provide means for controlling (by sampling and dumping) peak detector circuits 46 and 48 during the time the display screen of the cathode ray tube is blanked, viz., during the vertical blanking interval.

Upon commencement of system operation peak detector circuits 46 and 48 charge respective holding capacitors 222 and 220 to voltage levels of the peak white and black levels of the video and during the first vertical blanking period, the output voltage level of the respective capacitors are sampled and dumped and new peak white and black levels of the video are searched during the next field (next half frame). Sampling results processed during the first vertical blanking period may not provide meaningful results but this first result after initial system energization is not important since a transient condition.

The sample signal developed at output terminal 246 is coupled to the input terminal (base) of sample drive transistor 301 which inverts the sample signal and provides level shifting (to a 12 volt signal level). The level shifted sample signal opens and closes switching means comprising FET gates 304 and 305 coupled in series circuit with operation amplifiers 307 and 309 in sample and hold circuits 52 and 50 respectively in the black and white level signal processing channels.

The dump signal developed at output terminal 252 of pulse generating circuit 64 is coupled to the input terminal (base) of dump drive transistor 313 which inverts the dump signal and provides level shifting of the dump signal to the 12 volt level thereby opening or closing switching means comprising FET gates 312 and 314 in parallel series with holding capacitors 220 and 222 and in circuit to ground.

The buffered outputs of peak detectors 42 and 46 are sampled and held by sample and hold circuits 52 and 50 respectively. Sample and hold circuits 52 and 50 include variable potentiometers 401 and 403 coupled to an input terminal (pin 3) of operational amplifiers 307 and 309 respectively for adjustment to provide zero output voltages from the respective amplifiers when zero volts respectively is sampled at the amplifier inputs. Scaling circuit 68 provides means for scaling the peak white signal output coupled from sample and hold circuit 50. Scaling circuit 70 performs the similar scaling function however double inverts the peak black signal.

Proceeding now to a significant feature of the present system it wll be observed from FIGS. 5A – 5B that a plurality of voltage comparator circuits 101, 102, 103, 104, 105, 106, 107, 108, and 109 having the first input terminals (−) thereof coupled to a voltage divider network comprising a plurality of series connected resistors 88, 86, 84, 82, 80, 78, 76, 74, and 72 for biasing each of the voltage comparator circuits and the second terminals (+) of the comparator circuits coupled to the input terminal 60 for receiving the video signal, the voltage divider network comprising the plurality of series connected resistors coupled across the outputs of scaling circuits 70 and 68 to thereby provide a plurality of shades of gray (viz., nine since nine comparator circuits) between the voltage levels at the outputs of scaling circuits 70 and 68, viz., between the black peak and white peak levels. When the input video at the second input terminal (+) exceeds the bias levels as the first input terminals (−), the respective comparator circuits generate an output signal having a predetermined level, in this circuit a 4 volt digital signal. The 4 volt digital output signals are linearly summed by coupling to video amplifier circuit 210 (pin 3 of switching amplifier type MC 1545). A video driver circuit 121 is coupled between video switching amplifier circuit 210 and system output terminal 62 for providing coupling outputs of the video at proper levels for further utilization.

In the successful operation of the circuit of FIGS. 5A – 5B, all gates used were type SN74N00N, all transistors were type 2N3904, all FET's were type 2N4343, all diodes were type IN914A, and all linear IC's were decoupled from Vcc by a series 10 ohm resistor shunted to ground by a 0.01 uf capacitor.

The present system circuit design of FIGS. 5A – 5B has the capability of providing split screen presentation of processed and unprocessed video useful in certain applications of the present system concept, e.g., where a camera system is utilizing the present system processing in a video channel and it is necessary to make a decision as to whether continued automatic video enhancement is required or desired. At switching amplifier circuit 210, the processed video is coupled to a first input terminal (pin 3) and the unprocessed video is coupled to a second input terminal (pin 5). The output signal at the output terminal (pin 1) can be switched from the first input terminal to the second input terminal by coupling a logic control signal to the split screen input terminal (pin 2) of switching amplifier circuit 210. When it is desired to split the screen vertically a logic signal denoted split screen signal having the waveshape shown in FIG. 7 is generated by circuitry (not shown) locked to the horizontal drive pulse in the manner shown in the timing diagram of FIG. 7. A similar split display except horizontally may be provided by application of a similar pulse delayed however, from the vertical drive pulse.

Returning now to the input portion the system shown in FIGS. 5A – 5B and more specifically switching amplifier 208 in video clamp circuit means 44. Previously amplifier 208 was described as providing the function of disabling peak black detector circuit means 48 coupled thereto for a predetermined time period exceeding vertical and horizontal blanking periods. This predetermined time period during which peak black detector circuit means 48 is disabled commences before the beginning of vertical and horizontal blanking periods and continues beyond the end of said vertical and horizontal blanking periods. In FIG. 8, the entire visible picture area is shown and the difference between the total raster shown and the visible picture will be recognized as the vertical and horizontal blanking periods. The peak detector circuits 46 and 48 are disabled timewise in the manner previously described and search for peak white and black levels of opposite polarity in the incoming analog signal over a predetermined area of the raster screen scanned herein termed "window" which is less than the area of the scanned picture information. The reason for limiting the peak detectors 46 and 48 to search over only an area of the picture within the border of the visible picture area scanned on the cathode ray tube is that the input composite video signal coupled to input terminal 60 contains switching transient signals (gliches) during horizontal and vertical blanking periods which would lock up or disable the peak detectors 46 and 48 around these time intervals unless the detectors were disabled during these time intervals. Further the input camera video often has bias level irregularities adjacent the blanking intervals.

In order to define the window area within the picture information display area required for search by peak detectors 46 and 48 according to a feature of the present system, pulse generating circuit means 64 comprises means including dual monostable circuits 401 and 405 and gate circuits 407 and 408 for generating window search control signals at the output (pin 3) of gate circuit 408 for controlling peak detector circuit operation during window area time.

The manner of generation of the window search control signals which enable the peak detector search region which is less than the total raster area and less than the scanned visible television picture area of the video display as shown in FIG. 8 will be more fully described in the description which follows of the schematic of FIGS. 5A – 5B in which signal voltage waveshapes present during generation of these search control signals are shown in FIGS. 11 and 12.

The composite blanking signals coupled to input terminal 230 of pulse generator circuit 64 are inverted by gate circuit 407 (see FIG. 11). Although composite blanking signals contain both the vertical and horizontal blanking pulse components, only the horizontal blanking pulse components are utilized in producing the useful output signal from dual monostable circuit 401. The first section C3 of dual monostable circuit 401 provides an output pulse at output terminal 6 having a time duration of about 51 microseconds as seen in FIG. 11. The trailing edge of this pulse is utilized to generate a pulse having a time duration of about 11 microseconds at the output terminal (pin 9) of the second section of dual monostable circuit 401 (see FIG. 11) termed horizontal component of window search control signals.

Turning now to FIGS. 5A – 5B and the signal voltage waveshapes represented in FIG. 12 it will be noted also how the vertical component of window search control signals are generated.

The trailing edge of the V drive signal is obtained as a logic signal at the output terminal (pin 8) of gate circuit 240 and has the waveshape shown in FIG. 12 (also shown in FIG. 6). This output signal from gate circuit 240 is utilized as a trigger pulse coupled to the first half of dual monostable circuit 405. The output signal from the first half of dual monostable circuit 405 available at the output terminal thereof (pin 6) is coupled to input terminal 11 of the second half of dual monostable circuit 405 to trigger the second half and provide an output pulse at output terminal (pin 9) of approximately 2 milliseconds duration and having a delay time of approximately 14 milliseconds with respect to the trailing edge portion of the V drive pulse (see FIG. 12). This pulse at the output terminal (pin 9) of the second section of dual monostable circuit 405 comprises the vertical component of the window search control signals required to sample the portion of the video shown in FIG. 8 comprising the window area or peak detector search area. The vertical and horizontal components of the window signals are coupled to the inputs of gate circuit 408 where a NAND circuit function is provided the window control signals at the output terminal 3 of gate circuit 408.

Search control signals at the output of gate circuit 408 comprise logic signals processed by gate circuit delay means including circuits 401, 405, 407 and 408. Dual monostable circuits 401 and 405 include means (potentiometers 415 and 417 respectively) for varying the pulse lengths of the logic signals which provide the search control signals and thereby the search area or window searched by peak detectors 46 and 48.

The window signals generated by pulse generating circuit means 64 are coupled to switching amplifier circuit 208 (pin 2) for disabling peak black level detector circuit 48. Peak white level detector circuit 46 is clamped by video clamp circuit 42 to a constant level during search time by inverted window signals provided by gate 410 which are coupled to clamp circuit 42 through video driver circuit 58.

An important result of the above video information search function for detecting peak black and white level is that even though only a portion of the video information signals are searched for peak levels or excursions of these analog signals, the entire video information signal content is displayed without loss of video information during signal processing.

An analog version of the present automatic video enhancement signal processing is shown in block diagram in FIG. 9 in a system for copying documents. A document reading device 901 such as a television type camera provides a composite video information signal at input terminal 903 which is a television representation of the video information detected by camera 901 from the surface of document 905. Signal conditioning circuit means processes and couples the composite video to the inputs to black and white peak level detector circuits 48 and 46 in a manner similar to the signal processing previously described. However, black level clamping is accomplished in the manner shown in simplified schematic form in FIG. 10 wherein black level clamping circuit 909 provides zero level output at output terminal 911 of video amplifier circuit 913 for the composite black video level regardless of the amplitude level of the black level of the input video signal. Operational amplifier circuit 913 provides the scaling and drive functions required so that the signal coupled from operational amplifier circuit 913 to an input (−) of video amplifier circuit 913 biases the output of video amplifier circuit 913 so that the black level of the video at output terminal 911 of video amplifier circuit 913 is zero. Video AGC (automatic gain control) circuit 917 (see FIG. 9) then provides the gain to expand the video contrast and amplifying 0 volts (the black level established by the portion of the circuit of FIG. 10) still produces zero volts while the gray and white level signals are amplified. The circuit design of FIGS. 9 and 10 necessitates making the output of amplifier circuit 913 track the black level of the picture information signals. Video AGC amplifier means 917 should have a linear range in the range of about 20 to 1 requiring, e.g., the cascading of a plurality of video amplifiers (having a lesser gain range, e.g., 4 to 1) using a common AGC signal to produce a larger AGC range. Display unit 921 comprises a thin window CRT facing Electrofax printer means 923 of well-known type wherein the Electrofax paper is advanced in front of the face of the tube for recording the automatically enhanced video developed from document 905 and displayed by display unit 921. The copying system of FIGS. 9 and 10 is exemplary of applications of the present automatic video enhancement to copying systems wherein automatic video enhancement is desired and wherein image information is processed by searching for maximum and minimum amplitude levels in the signals representative of the image information which are then utilized in subsequent signal processing in accordance with the teachings of this invention to provide enhanced signals representative of the image information for utilization in reproducing the image. The image information signal to be enhanced in accordance with the teachings of this invention may comprise analog signals representative of variation in optical characteristics, e.g., light level variations reflected from various portions of the document scanned, while the video enhanced signal may be utilized to scan a latent image of the document in the form of a charge pattern on a surface which may thereafter be developed in accord with standard techniques, e.g., xerographic to produce a visible but video enhanced replica of the document scanned.

What is claimed is:

1. Apparatus for processing a video signal comprising peak detector means for detecting the peak white and peak black levels of said video signal and means coupled to said detector means for utilizing said detected peak white and peak black levels to provide the white and black levels in said processed video signal, and wherein each field of said processed video signal is displayed substantially one field in time subsequent to the field of the video signal field being sampled by said peak detector means.

2. A method of video signal processing to provide automatic contrast enhancement comprising the following steps:

detecting the peak white and peak black amplitudes of the video signal;

utilizing the voltage differential between peak white and peak black amplitudes detected to provide a plurality of bias voltage levels;

applying said plurality of bias voltage levels to individual voltage level channel comparators for quantizing the incoming video signal into a plurality of successive level signals; and recombining said successive level signals for coupling to a display unit to provide said automatic contrast enhancement of said incoming video signal.

3. An automatic contrast control circuit for processing an incoming analog type video signal comprising in combination:

means for coupling said incoming video signal to first input terminals of a plurality of digital comparator circuits for converting said analog type video signal into a digital type video signal;

first and second signal detecting means for detecting the peak white and peak black levels of said incoming video signal and providing a pair of output signals;

means for coupling differentially said output signals of said first and second signal detecting channels across a series resistance type potential divider circuit to divide said differential output into a plurality of step voltage level signals;

means for coupling said plurality of step voltage level signals to second input terminals of individual ones of said digital comparator circuits thereby providing comparison levels for said digital comparator circuits; and means coupled to the output terminals of said digital comparator circuits for summing the output voltages of said digital comparator circuits to provide an analog type video output signal.

4. In a copier system comprising a document reading device for generating an analog signal representative of the information content of the document;

first means for detecting the peak white level amplitude of said analog signal;

second means for detecting the peak black level amplitude of said analog signal;

black level clamping circuit means adapted to receive said analog signal and further coupled to receive the black level signal detected by said second means;

utilization means including a scanning device;

a video automatic gain control circuit having an output terminal and responsive to the black clamped video signal from said black level clamping circuit means and the white level signal from said first means and providing a further analog signal at said output terminal; and means coupling said output terminal of said video automatic gain control circuit to said scanning device for providing a video enhanced image of the information content of the document.

5. In combination in a television camera system including a television camera;

first means coupled to said television camera for detecting the peak black and white amplitude levels of the analog video signal generated by said television camera;

video digitizer circuit means coupled to said first means for converting said analog video signal into a plurality of different amplitude level signal voltages;

summing amplifier means coupled to said video digitizer circuit means for combining said different amplitude level signal voltages to provide a further analog type video information signal; and means for adding sync and blanking pulse signals developed by said television camera to said further analog type video information signal to provide a processed high contrast composite video signal.

6. The combination according to claim 5 further comprising means for simultaneously displaying said analog video signal and said processed high contrast video signal.

7. In a video contrast enhancement circuit for processing an analog signal representative of video information first means for coupling said analog signal to video clamping circuit means, said video clamping circuit means including a video switching amplifier circuit;

a video driver circuit;

a plurality of digital comparator circuits having first and second input terminals and an output terminal;

second means for coupling said analog signal to said video driver circuit and the first input terminals of said plurality of digital comparator circuits;

a further video switching amplifier circuit having an input terminal;

third means for coupling said analog signal to the input terminal of said further video switching amplifier circuit;

peak black level detector circuit means coupled to said video switching amplifier circuit, said black detector circuit means including a first holding capacitor connected across the output terminal thereof;

peak white level detector circuit means, said white detector including a first holding capacitor connected across the output terminal thereof;

further video clamp circuit means coupled between said video driver circuit and said peak white level detector circuit means;

pulse generating circuit means for providing sample and dump control signal voltages;

sample and hold circuit means coupled to said first and second holding capacitors;

fourth means including a transistor responsive to said dump signal for controlling switching means coupled across said first and second holding capacitors in circuit to ground;

fifth means including a transistor for controlling further switching means coupled in series circuit in said sample and hold circuit means;

first scaling circuit means coupled to said sample and hold circuit means for scaling the peak white signal output from said sample and hold circuit means;

second scaling circuit means coupled to said sample and hold circuit means for scaling the peak black signal output from said sample and hold circuit means and double inverting said peak black signal;

sixth means including voltage divider network means coupled to said second input terminals of said plurality of digital comparator circuits for biasing said plurality of digital comparator circuits;

seventh means for coupling said plurality of output terminals of said digital comparator circuits to said further video switching amplifier, and video driver circuit means responsive to the output of said further video switching amplifier for providing an analog signal representative of video information having contrast enhanced characteristics.

8. In a system for processing composite video signals including analog signals proportional to picture light values to develop window search control signals for processing the video within a window search area, vertical drive signals, and composite blanking signals;

first means responsive to said composite blanking signals for providing a horizontal component of window search control signals;

second means responsive to said vertical drive signals for providing a vertical component of window search control signals;

third means for combining said horizontal and vertical components to provide said window search control signals, and fourth means including peak detector means responsive to said window search control signals for determining maximum and minimum amplitudes of said analog signals within the window area.

9. The system according to claim 8 wherein said window area is wholely within the visible area of said scanned video signals.

* * * * *